US005674334A

United States Patent [19]

Instance

[11] Patent Number: 5,674,334

[45] Date of Patent: Oct. 7, 1997

[54] LABELS AND MANUFACTURE THEREOF

[76] Inventor: David John Instance, Guinea Hall, Sellindge, Kent TN25 6EG, United Kingdom

[21] Appl. No.: 443,669

[22] Filed: May 18, 1995

[30] Foreign Application Priority Data

May 27, 1994 [GB] United Kingdom .................. 9410729

[51] Int. Cl.[6] .............................. B32B 7/10; B31D 1/02

[52] U.S. Cl. .......................... 156/64; 156/227; 156/264; 156/268; 156/354; 156/361; 156/364; 156/443; 156/519; 156/552

[58] Field of Search ........................... 156/64, 227, 256, 156/264, 268, 352, 353, 354, 361, 362, 363, 364, 443, 517, 519, 552

[56] References Cited

U.S. PATENT DOCUMENTS

| | | | |
|---|---|---|---|
| 3,713,948 | 1/1973 | Kluger | 156/354 |
| 4,274,903 | 6/1981 | Mock . | |
| 4,359,358 | 11/1982 | Hattemer . | |
| 4,738,079 | 4/1988 | Lancaster et al. . | |
| 5,017,257 | 5/1991 | Murphy . | |
| 5,021,110 | 6/1991 | Kobayashi | 156/268 |
| 5,021,273 | 6/1991 | Kobayashi | 156/227 |
| 5,055,154 | 10/1991 | Zodrow et al. | 156/517 |
| 5,083,979 | 1/1992 | Burt . | |
| 5,127,676 | 7/1992 | Bockairo . | |
| 5,286,317 | 2/1994 | Treat et al. | 156/64 |
| 5,413,651 | 5/1995 | Otruba | 156/354 |

FOREIGN PATENT DOCUMENTS

| | | |
|---|---|---|
| 0087978 | 9/1983 | European Pat. Off. . |
| 0098092 | 1/1984 | European Pat. Off. . |
| 0130053 | 1/1985 | European Pat. Off. . |
| 0179575 | 4/1986 | European Pat. Off. . |
| 0180365 | 5/1986 | European Pat. Off. . |
| 0232054 | 8/1987 | European Pat. Off. . |
| 0252608 | 1/1988 | European Pat. Off. . |
| 0284703 | 10/1988 | European Pat. Off. . |
| 0342006 | 11/1989 | European Pat. Off. . |
| 0386849 | 9/1990 | European Pat. Off. . |
| 0472796 | 3/1992 | European Pat. Off. . |
| 0594560 | 4/1994 | European Pat. Off. . |
| 2001909 | 2/1979 | United Kingdom . |
| 2122968 | 1/1984 | United Kingdom . |
| 2127378 | 4/1984 | United Kingdom . |
| 2152005 | 7/1985 | United Kingdom . |
| 2164915 | 4/1986 | United Kingdom . |
| 2236297 | 4/1991 | United Kingdom . |
| 2240510 | 8/1991 | United Kingdom . |
| 8802308 | 4/1988 | WIPO . |
| 8905021 | 6/1989 | WIPO . |
| 8905727 | 6/1989 | WIPO . |
| 9002395 | 3/1990 | WIPO . |
| 9005631 | 5/1990 | WIPO . |
| 9104850 | 4/1991 | WIPO . |
| 9104851 | 4/1991 | WIPO . |
| 9204703 | 3/1992 | WIPO . |

*Primary Examiner*—Neil McCarthy
*Assistant Examiner*—Theodore M. Green
*Attorney, Agent, or Firm*—Rothwell, Figg, Ernst & Kurz, P.C.

[57] ABSTRACT

An apparatus for producing a succession of self-adhesive labels carried on a length of release backing material, the apparatus comprising a web feed device for feeding a first web, a cutting device for cutting the first web into a succession of individual sheets, a folding device for folding the sheets to form folded labels, a label feeder for feeding the folded labels in succession onto a second web including a release backing material and a web conveyor for moving the second web past the label feeder. There is also provided a method of producing a succession of self-adhesive labels carried on a length of release backing material, the method comprising the steps of:—(a) feeding a first web to a cutting and folding unit in which the web is formed into a succession of folded labels; (b) feeding, with a label feeder, the folded labels in succession from the cutting and folding unit onto a second web including a length of release backing material; and (c) moving the second web past the label feeder.

15 Claims, 3 Drawing Sheets

LABELS AND MANUFACTURE THEREOF

BACKGROUND TO THE INVENTION

The present invention relates to a method of producing self-adhesive labels and to an apparatus for producing self-adhesive labels.

The manufacture of multilayer self-adhesive labels has been known for some time. One type of multilayer labels consists of coupons which are typically used for promotional and marketing purposes on consumer products. The manufacture of coupons is disclosed, for example, in U.S. Pat. No. 4,359,358 in the name of Hattemer. In this earlier method, a top paper web is printed and adhered to a bottom web of labelstock material comprising a web of self-adhesive paper carried on a web of release material such as silicone-coated backing paper. The combined webs are die-cut to form a succession of two-layer coupons on the backing material and the waste skeleton formed of the waste portions of the top and self-adhesive paper webs is removed. Whilst this method is suitable for the manufacture of simple multilayer coupon labels, it is not suitable for the manufacture of complicated label structures having multiple folds.

Such complicated labels incorporating multiple folds are a second type of multilayer labels which, although also they can be used as coupons, are also typically used for the labelling of agrochemical and pharmaceutical products in which a significant amount of statutory information is required to be provided on the packaging of the product. Such labels have a labelling area which is significantly larger than the footprint of the self-adhesive label. Moreover, such labels can be provided with a fold line which lies across the web of release material carrying the resultant label, which is a structure which cannot be provided by the method of U.S. Pat. No. 4,359,358. Such labels are exemplified in EP-A-0087987, EP-A-0130053, EP-A-0252608; WO-A-89/05021, WO-A-90/02395, EP-A-0180365, EP-A-0232054, WO-A-90/05631, WO-A-91/04850, WO-A-91/04851 and WO-A-92/04703, all in the name of the present inventor David J. Instance. In the manufacture of these multilayer labels, a succession of individual label pieces is applied to a web. Methods and apparatus for the manufacture of such labels are disclosed in the patent specifications referred to above and also in GB-A-2127378, EP-A-0098092, EP-A-0179575, EP-A-0275670 and EP-A-0342006, also all in the name of Instance.

In each of these prior proposals a succession of individual label pieces is applied to a web. In the labelling of products with the resultant self-adhesive labels, particularly pharmaceutical products, it is essential that the labels have been correctly manufactured so that the correct labelling information is present on the product which is labelled. This is particularly so in the case of pharmaceutical products where mis-labelling can result in severe consequences both for the ultimate user of the pharmaceutical product and the pharmaceutical manufacturer. In the methods referred to hereinabove in which individual pieces are applied to a web, it is therefore crucial to exercise careful manufacturing control so as to ensure that the correct pieces are applied to the correct base web. It is also important to ensure that on a resultant reel of many thousands of self-adhesive labels, there are no missing labels and no labels wherein the printing is incorrect or a piece has been mis-applied to the underlying web. It is customary for pharmaceutical manufacturers to demand that each reel of self-adhesive label contains no missing or incorrectly manufactured labels otherwise there is a serious risk of mis-labelling of the pharmaceutical product with serious product liability consequences for the pharmaceutical manufacturer.

These prior methods of applying individual pieces to a web require very careful supervision and checking during manufacture in order to minimize these risks as a result of a missing applied piece or the application of an incorrectly printed piece to the web.

SUMMARY OF THE INVENTION

The present invention in one aspect aims to provide an improved method and apparatus for the manufacture of self-adhesive labels in order to provide greater security of manufacture of the self-adhesive labels.

Accordingly, the present invention provides an apparatus for producing a succession of self-adhesive labels carried on a length of release backing material, the apparatus comprising a web feed device for feeding a first web, a cutting device for cutting the first web into a succession of individual sheets, a folding device for folding the sheets to form folded labels, a label feeder for feeding the folded labels in succession onto a second web including a release backing material and a web conveyor for moving the second web past the label feeder.

The present invention further provides a method of producing a succession of self-adhesive labels carried on a length of release backing material, the method comprising the steps of:—(a) feeding a first web to a cutting and folding unit in which the web is formed into a succession of folded labels; (b) feeding, with a label feeder, the folded labels in succession from the cutting and folding unit onto a second web including a length of release backing material; and (c) moving the second web past the label feeder.

It is also known to manufacture self-adhesive multilayer labels in which folded labels are applied to a web, for example a labelstock web or a release web, which is not pre-printed or pre-cut.

The present invention in another aspect aims to provide an improved method and apparatus for the manufacture of die-cut self-adhesive labels utilising such a web.

The present invention still further provides an apparatus for producing a succession of self-adhesive labels carried on a length of release backing material, the apparatus comprising a label feeder for feeding folded labels in succession onto a web including a release backing material, a web conveyor for moving the web past the label feeder, and a die-cutting station downstream in the direction of web movement from the label feeder at which self-adhesive labels are die-cut on the release backing material, wherein the label feeder is controlled with respect to the operation of a die-cutter of the die-cutting station.

The present invention yet further provides a method of producing a succession of self-adhesive labels carried on a length of release backing material, the method comprising the steps of:—(a) feeding, with a label feeder, a succession of folded labels in succession onto a web including a length of release backing material; (b) moving the web past the label feeder; and (c) die-cutting self-adhesive labels on the release backing material at a die-cutting station downstream in the direction of web movement from the label feeder, wherein the feeding of the labels by the label feeder is controlled with respect to the operation of the die-cutter at the die-cutting station.

BRIEF DESCRIPTION OF THE DRAWINGS

Embodiments of the present invention will now be described by way of example only, with reference to the accompanying drawings, in which.

DETAILED DESCRIPTION OF THE PREFERRED EMBODIMENTS

Figure 1:
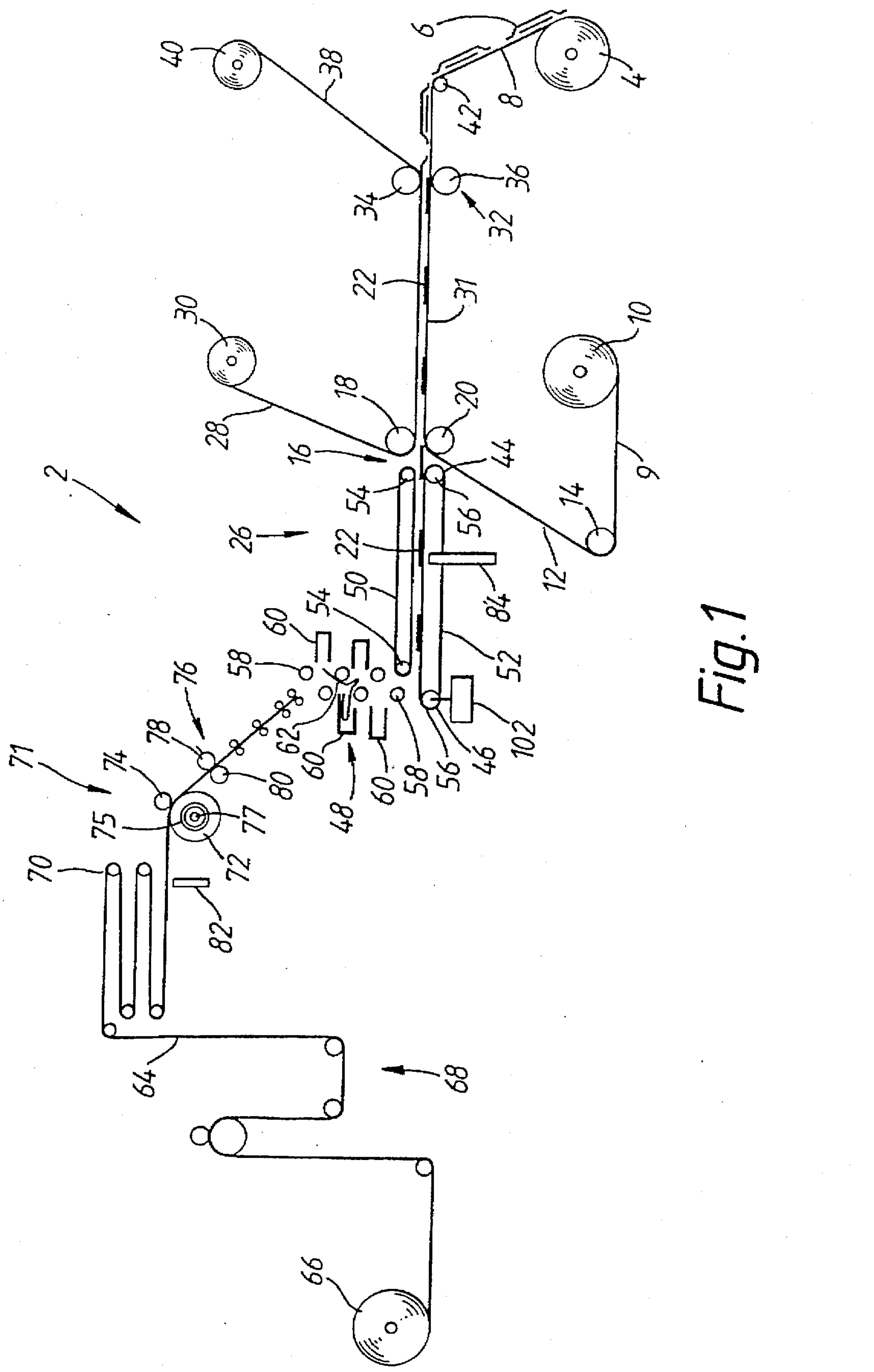
FIG. 1 is a schematic side view of an apparatus for manufacturing labels in accordance with a first embodiment of the present invention.

Referring to FIG. 1, there is shown an apparatus, designated generally as 2, for producing a reel 4 carrying a succession of self-adhesive labels 6. The reel 4 comprises an indeterminate length of a backing web 8 of release material, typically comprising a silicone-faced backing paper. The backing web 8 is provided in a reel 10 of duplex labelstock material 9 comprising a self-adhesive web 12 of paper or plastics which is coated on its reverse side with pressure-sensitive adhesive and is carried on the release material web 8. The reel 10 is mounted in the apparatus 2 as a supply reel which is fed out over one or more guide rollers 14 to a label applying station, designated generally as 16, which includes a pair of opposed rollers 18,20 between which the labelstock material 9 is passed. At the label applying station 16, individual folded printed labels 22 are fed between the rollers 18,20 by a label feed system designated generally as 26, whereby the folded labels 22 are applied to the upper surface of the self-adhesive web 12. A self-adhesive laminate 28, typically of plastics, is fed out from a supply reel 30 and between the rollers 18,20 so as to be laminated by its self-adhesive surface over the folded labels 22 which have been applied to the underlying web 12 of self-adhesive material. The folded labels 22 are thereby adhered to the self-adhesive web 12. The combined web/label assembly 31 is conveyed to a die-cutting station designated generally as 32 which includes an upper die-cutting roller 34 with a lower opposed backing roller 36. The die-cutting station 34 is downstream in the direction of web movement from the label feed system 26. At the die-cutting station 32, the resultant self-adhesive labels 6 are cut out from the overlying laminar material 28, the folded labels 22 and the self-adhesive web 12. The release web 8 is not cut. The waste web skeleton 38 which may include waste pieces of the folded labels 22 is wound up on a waste reel 40 and the web of release backing material 8 carrying the succession of self-adhesive labels 6 is wound up on reel 4 as a take-up reel, the backing material web 8 having been fed over one or more guide rollers 42.

The label feed system 26 has an output end 44 past which the labelstock material 9 comprising the self-adhesive web 12 carried on the web 8 of release backing material is moved by a web conveying system comprising a drive unit (not shown) and the supply and take-up reels 10,4 and the guide rollers 14,42, the drive unit rotating at least the take-up reel 4 and optionally the supply reel 4 and/or one or more of the guide rollers 14,42. The label feed system 26 also includes an input end 46 which is disposed beneath a sheet folding unit designated generally as 48. The label feed system 26 has a conveying device which comprises upper and lower endless belts 50,52 which are mounted between respective pairs of rollers 54,56. The endless belts 50,52 are rotatably driven by the respective rollers 54,56 at least one of which is in turn driven by a feed motor 102 so as to move folded labels 22 in succession from the input end 46 at which folded labels 22 are received from the folding unit 48 to the output end 44 at which folded labels 22 are fed onto the self-adhesive web 12 between the rollers 18,20.

The folding unit 48 is of generally known construction and comprises a zig-zag array of folding rollers 58 together with a zig-zag array of folding pockets 60 on opposed sides of the array of rollers 58. In use, the folding rollers 58 rotate continuously to drive a sheet through the folding unit 48. In use, a sheet 62 is fed through the uppermost pair of rollers 58 and into the uppermost folding pocket 60. When the leading edge of the sheet 62 hits the end of the folding pocket 60, the sheet 62 continues to be fed by the rollers 58 and the initially flat sheet 62 is then upset by this continued feeding so as to have a folded configuration with a single fold. The location of the fold in the sheet 62 is determined by the depth of the folding pocket 60. The single folded sheet 62 is then fed by the next pair of rollers 58 (i.e. the second and third rollers) in the zig-zag array into the second folding pocket 60 and in the same way a second fold line is formed. This process continues until the desired folded sheet 62 is achieved, the sheet having a number of fold lines corresponding to the number of folding pockets 60. The resultant fully folded label 22 is then fed out from the lowermost pair of rollers 58 between the endless belts 50,52 of the label feed system 26.

The folding unit 48 is supplied continuously with printed sheets 62 which have been formed from a single printed web 64 which has been fed out from a supply reel 66 thereof. The web 64 has typically been printed on one or both sides by a flexographic, letterpress, digital offset or lithographic offset printing technique. The printed web 64 is fed out from the reel 66 by a web unwind and guide apparatus, designated generally as 68, and the web is fed to a festoon 70 at which a supply length of the printed web 64 is tensioned. The web 64 then passes between a drive roller 72 and an upper opposed roller 74 of a web feed system 71 which feeds the web intermittently to a cutting device 76 comprising a cutting roller 78 and an opposed backing roller 80. The cutting device 76 cuts off a desired length of the printed web to form a separate printed sheet 62 which is then fed into the folding unit 48.

The drive roller 72 is driven by an electromagnetic clutch 75 which has its input shaft 77 continuously driven. The electromagnetic clutch 75 is actuated intermittently so as to rotate the drive roller 72 when the printed web 64 is required to be fed through the cutting device 76.

The feed motor 102 continuously drives not only at least one of rollers 54,56 thereby continuously rotating the endless belts 50,52 of the label feed system 26 but also continuously drives the folding rollers 58 of the folding unit 48 and the input shaft 77 of the electromagnetic clutch 75 of the drive roller 72 for the printed web 64. Preferably, the driven roller or rollers 54,56, the folding rollers 58 and the input shaft 77 are mechanically geared together, thereby providing a mechanical coupling between the web feed system 71, the folding unit 48 and the label feed system 26.

The apparatus 2 includes a number of sensors, with associated control systems, for controlling and coordinating the operation of the various parts of the apparatus 2. A printed web sensor 82 is provided between the festoon 70 and the drive roller 72 for the printed web 64. The sensors 82, which is typically a photodetector, is adapted to detect a series of printed marks along the printed web 64. The detection of each printed mark causes a detection signal to be generated which switches off the electromagnetic clutch 75 for the drive roller 72 and actuates the cutting device 76 when the web 64 has stopped. The cutting device, and the web drive, are thereby operable in response to a detection signal from the sensor. This ensures that accurately cut printed sheets 62 are formed from the printed web 64, each printed sheet 62 having the required length and being registered with respect to the printing on the web 64. The web 64 is then moved again through the cutting device 76 after a short delay in the next cycle by actuation of the electromagnetic clutch 75 for the drive roller 72.

A second sensor 84 is provided in the label feed system 26 and is adapted to detect each folded label 22 as it passes along the label feed system 26. The sensor 84 is typically a photodetector which is adapted to detect either an edge, for example the leading edge, of each folded label 22 or a printed registration mark on each folded label 22. The second sensor 84 is adapted to control the application of the folded label 22 to the self-adhesive web 12 so that it is in registry with the die-cutting roller 34. This registration is employed when the web 9 is not pre-printed, pre-cut or otherwise provided with a succession of registration points along the length of the web 9. The second sensor 84 controls the application of the folded label 22 by varying the speed of the feed motor 102 in the manner described below. The variation of the speed of the feed motor 102 causes corresponding speeding up or slowing down of the web feed system 71, the folding unit 48 and the label feed system 26 which are coupled together.

An embodiment of a control system for controlling and coordinating the operation of the label feed system 26 together with the web feed system 71 and the folding unit 48, the web conveying system and the die-cutting roller 34 of FIG. 1 will now be described with reference to FIG. 2. The web conveying system 86 comprises a main motor 88 which drives the take-up reel 4 and preferably at least one of the supply reel 10, the guide rollers 14,42 and the rollers 20 and 36. A speed setter 90 inputs a digital signal into the main motor 88 representative of the desired web speed. The main motor 88 is connected to an encoder 92 which is adapted continuously to output a series of pulses, the instantaneous rate of which is related to the actual speed of the main motor 88. The pulses are received by a motor control 94 which compares the instantaneous pulse rate with the rate of the desired set speed and if there is a difference in those two rates, the motor control 94 outputs a feedback signal which is received by the main motor 88 and instantaneously corrects the speed of the main motor 88.

This feedback control provides continuous instantaneous control of the speed of the main motor 88 so that at any given time the actual speed is the same as the desired set speed.

The encoder 92 also outputs a pulse signal, comprising a series of pulses at a particular rate, to a pulse counter 96. Each pulse is representative of a specific angular rotation of the main motor 88 and thus is representative of a specific distance which the labelstock web material has moved as a result of being driven by the main motor 88.

The pulse counter 96 outputs a series of pulses to a ratio selector 98. However, in an alternative arrangement, the series of pulses could be outputted directly to the ratio selector 98 from the encoder 92. The ratio selector 98 can be set to a predetermined ratio, typically to four decimal places, so that the pulse rate output therefrom is a predetermined ratio of the pulse rate input from the pulse counter 96. The output of pulses from the ratio selector 98 is fed to a motor control 100 for a feed motor 102 of the label feed system 26. The motor control 100 outputs a pulsed motor control signal to the feed motor 102 and the feed motor 102 rotates at a speed governed by the pulse rate of the pulsed motor control signal. In this way, the pulsed motor control signal controls the feed motor 102 and thereby the rate at which folded printed labels 22 are delivered onto the self-adhesive web 12 by the label feed system 26. The rate at which the printed web 64 is fed by the web feed system 71, thereby controlling the rate at which printed sheets 62 are fed into the folding unit 48, and the rate of operation of the folding unit 48 are also correspondingly controlled because the web feed system 71 and the folding unit 48 are geared to the label feed system 26.

In a manner similar to that of the main motor 88, the feed motor 102 is connected to an encoder 104 which is adapted continuously to output a series of pulses, the instantaneous rate of which is related the actual speed of the feed motor 102. The pulses are received by the motor control 100 which compares the instantaneous pulse rate with the rate of the desired set speed. If there is a difference in the two pulse rates, the motor control 100 outputs a feedback signal which may be positive or negative depending on whether the feed motor 102 is running slow or fast. The feedback signal is added arithmetically to the pulsed input from the ratio selector 98 to form the pulsed motor control signal which is fed to the feed motor 102. Thus the pulsed motor control signal may be continuously varied to ensure that the feed motor 102 is running at a speed that is at the desired ratio of the speed of the main motor 88. It will be understood that the motor control 100 also acts as a pulsed signal accumulator.

In this way the web conveying system and the label feed system can be arranged to run at a set speed ratio, the speed ratio being related to the length of each finished label, the length of each folded label which is applied to the web and the spacing between the folded labels on the web.

The label feed system 26 is also controlled with respect to the die-cutting roller 34 so as to ensure that when each folded printed label 22 is applied to the self-adhesive web 12, the folded printed label 22 is applied at substantially the correct position, irrespective of any fluctuations or variations in the position of the folded printed labels upstream of the sensor 84 in the label feed system 26 and the folding unit 48, so that when the folded printed label 22 is cut by the die-cutting roller 34 at the die-cutting station 32, the die-cut is substantially in registration with the folded printed label 22.

The die-cutting roller 34 is provided with a die-sensor 106. The die-sensor 106 detects when the die-cutting roller 34 is at a prescribed angular orientation and thus correlates the die-cutting roller 34 with respect to a particular stage of the die-cutting cycle. For example, the die-sensor 106 may be arranged to emit a die-signal at the commencement of a rotary die-cutting operation. The die-sensor 106 is adapted to input a die-sensor signal to the pulse counter 96 which triggers the pulse counter 96 into outputting a pulse count signal to a comparator 108. The folded label sensor 84 also sends a signal to the comparator 108 when it detects a folded label 22. The two signals from the pulse counter 96 and the folded label sensor 84 received by the comparator 108 are processed and compared to yield an error signal which is indicative of any distance which the actual position of the detected folded label 22 in the label feed system 26 leads or lags a desired position which is in registry with respect to the die-cutting roller. 34. Such an error signal is outputted by the comparator 108 to the motor control accumulator 100 of the label feed system 26. This causes the feed motor 102 of the label feed system 26 to be instantaneously speeded up or slowed down thereby to advance or retard the application to the self-adhesive web 12 of the detected folded label 22 in the label feed system 26 so that that detected folded label 22 is applied to the self-adhesive web 12 at the correct position with respect to the downstream die-cutting operation by the die-cutting roller 34. In this label producing apparatus, the die-cutting roller 34 defines the position of the resultant self-adhesive labels 6 along the web of release material 4 and the position of the folded printed labels 22 is registered on the labelstock web 9 with respect to the die-cutting roller 34. Thus the folded printed labels 22 in the label feed system 26 chase the position of the die-cutting roller 34 and each folded printed label 22 is applied to a target position on the web 12 which is correlated to a subsequent die-cut made by the die-cutting roller 34.

The operating speeds of the printed web feed system 71 and the folding unit 48 are preset with respect to the set speed of the label feed system 26 so that folded sheets 22 are fed at a desired rate from the folding unit 48 into the label feed system 26, but those operating speeds are varied in synchronism with any variation in the actual speed of the label feed system as a result of the coupling of those components together.

In operation, the web drive unit 68 continuously feeds the printed web 64 into the festoon 70, and any slack in the web 64, as a result of the intermittent operating of the drive roller 72 as described below, is taken up by the web drive unit 68. The drive roller 72 feeds the printed web 64 through the cutting device 76 until the sensor 82 detects the next printed mark on the printed web 64. At this point, the desired length of the printed web 64 has been fed through the cutting device 76. The drive roller 72 is instantaneously stopped by the electromagnetic clutch 75 to stop the web movement through the cutting device 76 and the cutting roller 78 is actuated to cut the desired length from the printed web 64. The cut sheet 62 is then fed into the folding unit 48, folded to the desired folded configuration and then fed between the endless belts 50,52 of the label feed system 26. After the cutting operation, the web drive roller 72 is started again to commence the next feeding, cutting and folding cycle.

The label feed system 26 operates continuously and applies the succession of folded printed labels 22 onto the continuously moving web 12. As described hereinabove, the speed of the label feed system 26 is set to be a particular ratio of the speed of the web conveying system and the application of each folded printed label 22 to the web 12 is controlled with respect to the position of the die-cutting roller 34.

The folded printed sheets 22 are adhered to the self-adhesive web 12 by the self-adhesive laminar material 28 and then the combined assembly 31 is die-cut at the die-cutting station 32 and the waste 38 removed.

In the illustrated embodiment of the invention, the reel 10 consists of a duplex labelstock material consisting of a self-adhesive web 12 carried on a backing web 8 of release material. However, in accordance with another embodiment of the present invention the reel 10 may simply comprise a single web 8 of release backing material whereby the folded printed sheets 22 are applied directly to the web 8 of release backing material and are overlaminated by the self-adhesive laminar material 28.

In a further embodiment of the invention, an adhesive applicator may be disposed between the label applying station 16 and the supply reel 10. The adhesive applicator is adapted to apply an adhesive such as pressure-sensitive adhesive to the upper surface of the self-adhesive web 12 when a duplex labelstock material is used or to the upper surface of the web 8 of release backing material when a single release web 8 is used. Thereafter, the folded printed labels 22 are adhered by their rear surface to the self-adhesive web 12 or the release material web 8. The adhesive may be applied as a continuous layer or, alternatively, the adhesive may be applied as a succession of patches, with each patch corresponding to the position of a corresponding folded printed label 22 on the web. When patches of adhesive are applied, the application of each patch of adhesive may be controlled by the sensor 84 in the label feed system 26 whereby each patch of adhesive is applied when the sensor 84 detects a folded label 22 whereby the patch of adhesive is in registry with the detected label 22 when the label 22 is applied to the web. When the sensor 84 detects a folded printed label 22, the adhesive applicator is triggered into operation either immediately or after a delay and is arranged to deposit a patch of adhesive of the desired size and dimensions on the underlying web. In this way, the adhesive patch is registered to the folded label 22 which is applied thereover.

In an alternative arrangement, the printed web 64 may be cut to form printed sheets 62 with waste web portions between adjacent printed sheets 62. The cutting unit 76 may then be adapted to effect two cuts during one cutting cycle, the first cut to cut off the printed sheet 62 and the second cut to cut of a waste web portion. The waste web portion may be ejected from the web feed system or the folding unit and discarded. This arrangement may be employed when the printed web 64 is printed with a repeat length which is not the same as the length of the printed sheet. This enables the apparatus to utilise webs having fixed repeat lengths irrespective of variations in size of the printed sheets 62. This is an important advantage because it enables the use of webs printed with fixed repeat lengths to be used, for example those produced by a digital offset or lithographic offset printing process which enables high quality printed images to be printed on the labels, for varying lengths of printed sheets.

In a yet further embodiment of the invention, when adhesive is applied either to a self-adhesive web or to a release backing material as patches, the patches of adhesive may be patterned in the manner disclosed in the applicant's earlier WO-A-90/14218 whereby each patch of adhesive lies within the periphery of the applied folded printed sheet 22 and the use of an overlaminating self-adhesive laminar material may be omitted.

Figure 3:
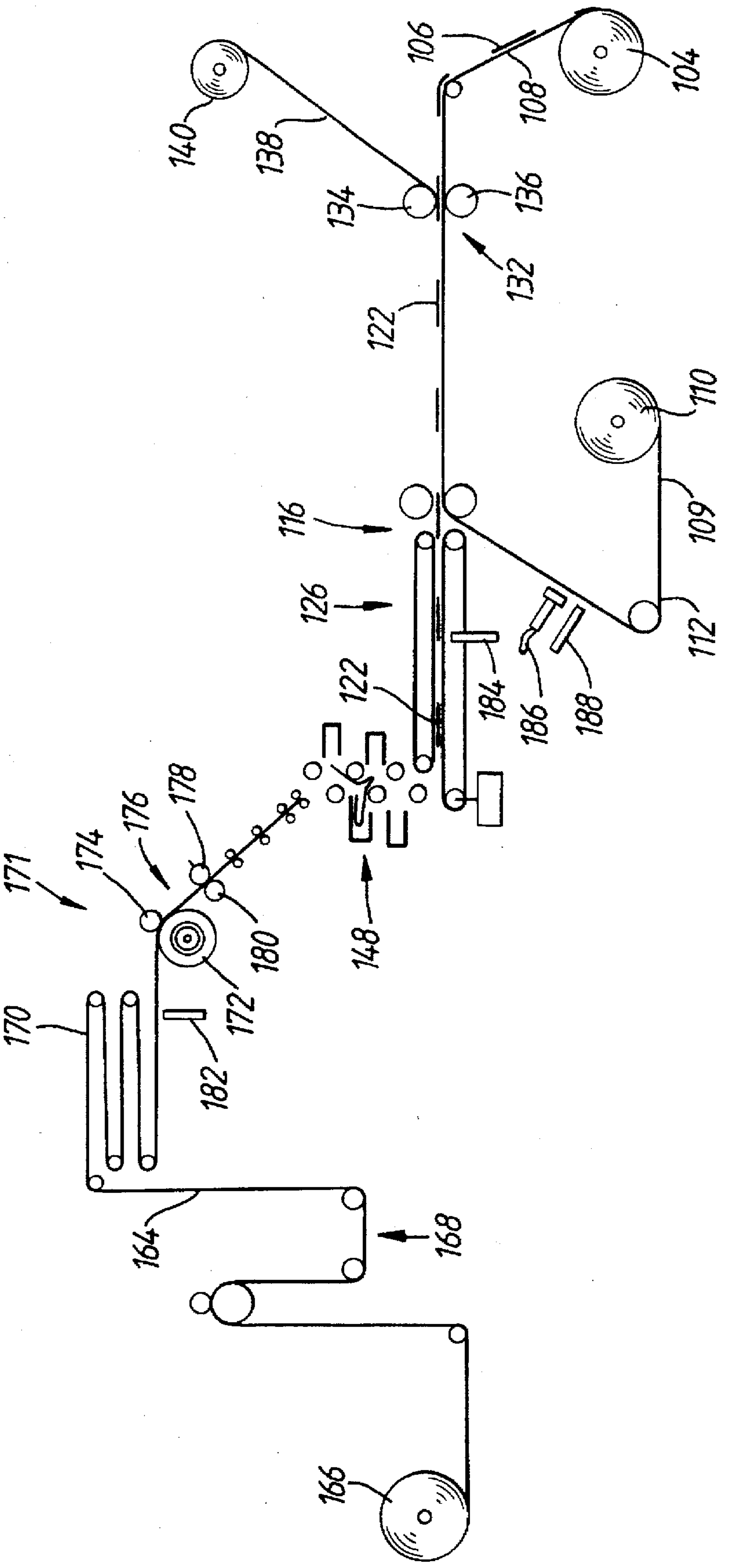
FIG. 3 is a schematic side view of an apparatus for producing labels in accordance with a second embodiment of the present invention.

FIG. 3 shows a further embodiment of the present invention, in which, in a manner similar to that of the first embodiment, an apparatus for producing a reel 104 of self-adhesive label 106 on a backing web 108 of release material includes a web conveying system for conveying a web 109 from a supply reel 110 thereof successively through a label applying station 116 and a die-cutting station 132. The web 109 comprises a duplex labelstock material with a self-adhesive paper web being carried on the backing web 108 of release material. At the label applying station 116, folded printed labels 122 are applied to the web 109 by a label feed system 126 having substantially the same configuration as that shown in FIG. 1. The folded labels 122 are fed between opposed rollers 118,120. The folded printed labels 122 are formed from a printed web 164 which is fed out from a supply reel 166 by a web unwind and feed unit 168 and the web is then passed through a festoon 170, over a sensor 182 for detecting printed marks on the printed web 164, through a web drive system 171 including a drive roller 172 and backing roller 174, through a web cutting unit 176, including cutting and backing rollers 178,180, and into a folding unit 148. These components have substantially the same configuration as shown in the embodiment of FIG. 1.

In this embodiment, adhesive is applied to the upper surface of the self-adhesive web 112 by an adhesive applicator 186 which extrudes adhesive, for example a water-soluble or pressure-sensitive adhesive, as a series of patches onto the web 112. The self-adhesive web 112 is pre-printed with a succession of images along its length and the adhesive patches are applied in registration with the printed images. A sensor 188, which is preferably a photodetector, is adapted to detect a succession of preprinted marks along the length of the self-adhesive web 112. The sensor 188 operates in conjunction with a control system (not shown) to coordinate the application of the adhesive and of the folded label to the self-adhesive web 112 so that both the adhesive and the folded label 122 coincide at the correct point on the web in registry with the printed image.

Figure 2:
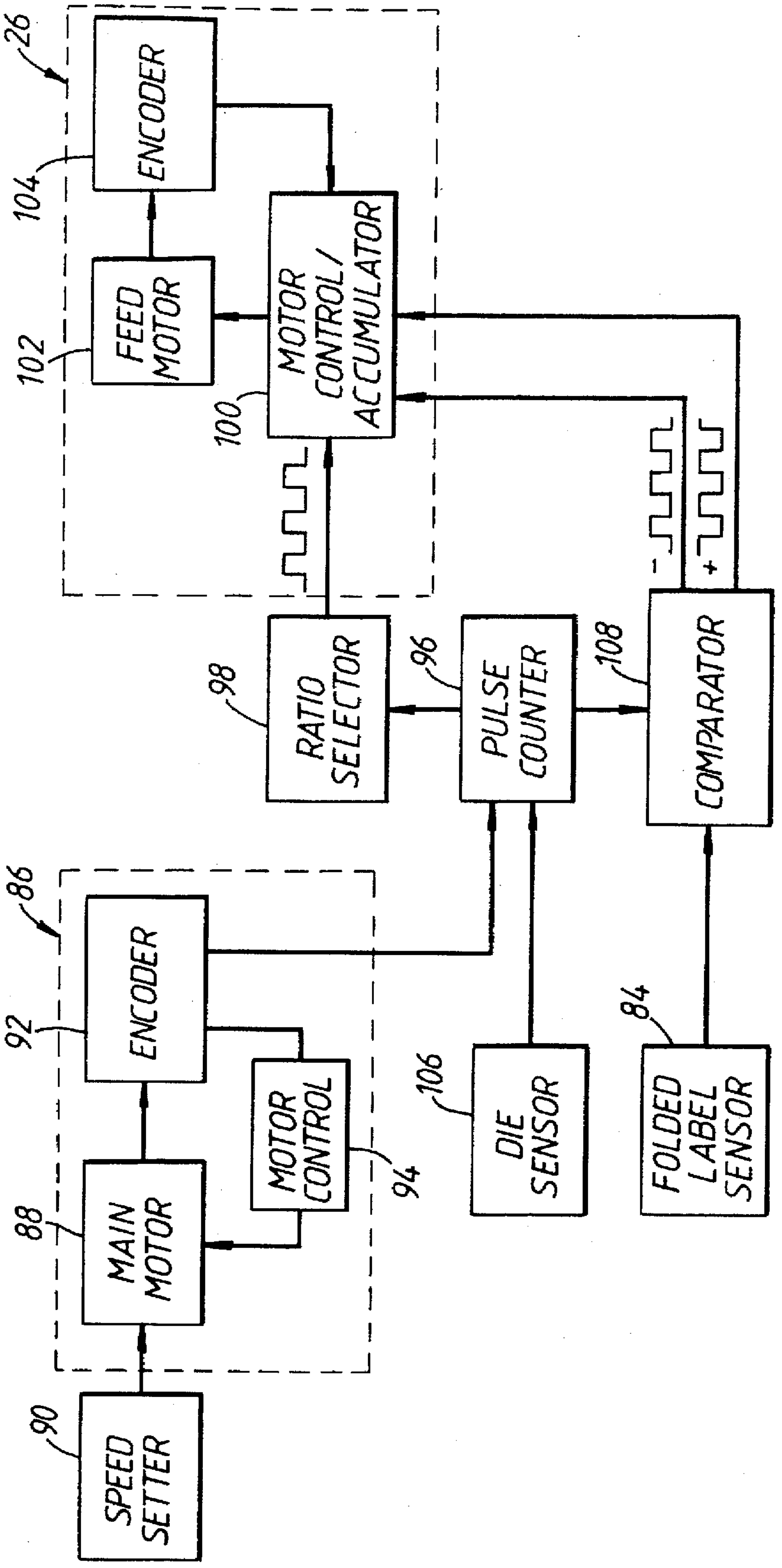
FIG. 2 is a schematic representation of the control system of the apparatus of FIG. 1.

The control system has a similar arrangement to that shown in FIG. 2, but with the modification that the folded label sensor 184 sends a signal to the pulse counter when a folded label 122 is detected in the label feed system 126. The pulse counter sends a pulse signal to the comparator and the comparator also receives a signal from the web sensor 188 when the web sensor 188 detects a printed mark on the self-adhesive web 112. The comparator processes the signals to produce an error signal which is employed either to advance or retard the application of a folded label 122 by the label feed system 126 to the self-adhesive web 112. The folded label sensor 184 or the web sensor 188 can be employed to trigger the application of adhesive to the self-adhesive web 112 by the adhesive applicator 186.

In this embodiment, because the self-adhesive web is printed with a succession of images, it is necessary for the die-cutting operation to be in registry with the printed images. Accordingly, a signal from the web sensor 188 is also employed to advance or retard the cutting action of the die-cutting roller 134 so that the cutting is in registry with the printed image on the self-adhesive web 112 and, consequently, with the applied folded label 122 and its underlying patch of adhesive. The die-cutting roller 134 is backed by a backing roller 136. The waste web 138, including the skeleton of the waste portions of the self-adhesive web 112, is wound up in a reel 140.

It will be apparent to those skilled in the art that various modifications can be made to the illustrated embodiments. The folded labels which are applied to the web can have a variety of different folded configurations. The folded labels may be applied to a printed or unprinted web, to a self-adhesive web of a labelstock web or to a release web. The self-adhesive web of the labelstock web may have been pre die-cut so as to comprise a series of self-adhesive labels on a release web. A self-adhesive or non-adhesive laminar material may be laminated over the folded labels. The folded labels may be adhered to the web by adhesive which has been applied to the web. Both the illustrated embodiments incorporate a die-cutter for cutting the resultant self-adhesive labels. In other embodiments of the invention, a die-cutter is not utilised. In further embodiments, instead of a die-cutter, the release web and the applied folded labels may be slit longitudinally into one or more webs each carrying a succession of self-adhesive labels.

The present invention can provide a significant technical advantage over the prior proposals in enabling the manufacture of multilayer self-adhesive labels which can have a variety of different folded configurations from two starting webs. This greatly facilitates quality control of the labels as compared to prior processes because the folded printed sheets are cut from a web and folded on line which removes the possibility of missing folded labels, or the wrong, mis-printed or incorrectly folded labels being applied to the web.

The present invention can also provide an apparatus and method for reliably and efficiently manufacturing die-cut self-adhesive labels on a release web wherein the starting web to which folded labels have been applied is not printed, cut or otherwise provided with registration marks. The folded labels are applied in registry with the subsequent die-cutting operation.

What is claimed is:

1. An apparatus for producing a succession of self-adhesive labels carried on a length of release backing material, the apparatus comprising a web feed device for feeding a first web, a cutting device for cutting the first web into a succession of individual sheets, a folding device for folding the sheets to form folded labels, the folding device comprising a plurality of folding pockets for forming a plurality of fold lines in each folded label, a label feeder for feeding the folded labels in succession onto a second web including a release backing material and a web conveyor for moving the second web past the label feeder.

2. An apparatus according to claim 1, wherein the folding device is mounted so as to deposit the folded labels into a conveying device of the label feeder.

3. An apparatus according to claim 1, wherein the label feeder comprises a pair of endless belts between which the folded labels are moved from the folding device to a label applying station at which the folded labels are applied to the second web.

4. An apparatus according to claim 1, wherein the web feed device includes a sensor for detecting a succession of printed marks on the first web and the cutting device is operable in response to a detection signal from the sensor.

5. An apparatus according to claim 4, wherein the web feed device is adapted to stop the movement of the portion of the web which is cut by the cutting device during the cutting operation in response to the detection signal.

6. An apparatus according to claim 1, further comprising a die-cutting station at which the self-adhesive labels are die-cut on the release backing material and wherein the label feeder is controlled with respect to the operation of a die-cutter of the die-cutting station.

7. An apparatus according to claim 6, wherein the die-cutting station includes a die-sensor which emits a die signal representative of the position of the die-cutter at a prescribed point in a die-cutting cycle and the label feeder is controlled with respect to the die signal.

8. An apparatus according to claim 7, wherein the label feeder includes a label sensor which detects each folded label in the label feeder and emits a label detection signal, and further comprising a processing device for comparing the label detection signal and the die signal to yield an error signal which is employed to advance or retard the label feeder whereby the application of each folded label to the web is registered to a subsequent die-cutting step.

9. A method of producing a succession of self-adhesive labels carried on a length of release backing material, the method comprising the steps of:

(a) feeding a first web to a cutting and folding unit in which the web is formed into a succession of folded labels the cutting and folding unit comprising a plurality of folding pockets for forming a plurality of fold lines in each folded label;

(b) feeding, with a label feeder, the folded labels in succession from the cutting and folding unit onto a second web including a length of release backing material; and (c) moving the second web past the label feeder.

10. A method according to claim 9, wherein the cutting and folding unit is arranged to deposit the folded labels into a conveying device of the label feeder.

11. A method according to claim 10, further comprising detecting a succession of printed marks on the first web with a sensor and cutting the first web in response to that detection.

12. A method according to claim 11, further comprising stopping the movement of the first web in response to the detection of the printed marks whereby the first web is stationary when cut by a cutting device of the cutting and folding unit.

13. A method according to claim 9, further comprising die-cutting the self-adhesive labels on the release backing material, and wherein the feeding of the labels by the label feeder is controlled with respect to the operation of a die-cutter at a die-cutting station.

14. A method according to claim 13, wherein the position of the die-cutter at a prescribed point in a die-cutting cycle is detected and the label feeder is controlled with reference to the detected die-cutter position.

15. A method according to claim 14, wherein the position of each label in the label feeder is detected and wherein signals representing the die-cutter position and the folded label position are processed to yield an error signal which is employed to advance or retard the label feeder whereby the applicator of each folded label to the web is registered to the subsequent die-cutting step.

* * * * *